United States Patent
Polovets

(10) Patent No.: US 10,957,307 B2
(45) Date of Patent: Mar. 23, 2021

(54) MODULAR LANGUAGE MODEL ADAPTATION

(71) Applicant: Microsoft Technology Licensing, LLC, Redmond, WA (US)

(72) Inventor: George Ion Polovets, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 172 days.

(21) Appl. No.: 16/368,275

(22) Filed: Mar. 28, 2019

(65) Prior Publication Data
US 2020/0312301 A1    Oct. 1, 2020

(51) Int. Cl.
| | | |
|---|---|---|
| *G10L 15/065* | (2013.01) | |
| *G06N 3/08* | (2006.01) | |
| *G10L 15/06* | (2013.01) | |
| *G10L 15/16* | (2006.01) | |
| *G10L 15/183* | (2013.01) | |

(52) U.S. Cl.
CPC .............. *G10L 15/065* (2013.01); *G06N 3/08* (2013.01); *G10L 15/063* (2013.01); *G10L 15/16* (2013.01); *G10L 15/183* (2013.01)

(58) Field of Classification Search
CPC ..... G10L 15/065; G10L 15/063; G10L 15/16; G10L 15/183; G06N 3/08
See application file for complete search history.

(56) References Cited

U.S. PATENT DOCUMENTS

| | | | |
|---|---|---|---|
| 2017/0169815 A1* | 6/2017 | Zhan | G10L 15/14 |
| 2019/0066662 A1* | 2/2019 | Kurata | G10L 15/14 |
| 2019/0080019 A1* | 3/2019 | Young | G06K 9/6256 |
| 2020/0234101 A1* | 7/2020 | Hanselmann | G06N 3/08 |

FOREIGN PATENT DOCUMENTS

CN    106297800 A    1/2017

OTHER PUBLICATIONS

Extensions of Recurrent Neural Network Language Model Toma's Mikolov, Stefan Kombrink, Lukas Burget, Jan "Honza" Cernocky, Sanjeev Khudanpur, Brno University of Technology, Speech@Fit, Czech Republic 2 Department of Electrical and Computer Engineering, Johns Hopkins University, USA (ICASSP 2011) (Year: 2011).*

(Continued)

*Primary Examiner* — Mohammad K Islam
(74) *Attorney, Agent, or Firm* — Schwegman Lundberg & Woessner, P.A.

(57) ABSTRACT

Systems and techniques for modular language model adaptation are described herein. A set of adaptation training data and a set of parameters may be received from a recurrent neural network model. A set of adaptation parameters may be determined using the set of adaptation training data. A set of outputs of the recurrent neural network model may be modified using output of an evaluation of the set of adaptation training data using the set of adaptation parameters. An adaptation module may be generated that includes a set of adaptation module parameters based on the modified set of outputs. The adaptation module may be added to the recurrent neural network model for evaluation of inputs corresponding to the set of adaptation parameters.

20 Claims, 6 Drawing Sheets

(56) References Cited

OTHER PUBLICATIONS

129: Artificial Neural Networks, Ajith Abraham, Oklahoma State University, Stillwater, OK, USA (Handbook of Measuring System Design, edited by Peter H. Sydenham and Richard Thorn. 2005 John Wiley & Sons, Ltd. ISBN: 0-470-02143-8.) (Year: 2005).*

Jaech, et al., "Low-Rank RNN Adaptation for Context-Aware Language Modeling", In Journal of Computing Research Repository, Oct. 2017, 13 Pages.

Li, et al., "Recurrent Neural Network Language Model Adaptation for Conversational Speech", In Proceedings of Conference of the International Speech Communication Association, Sep. 2, 2018, 5 Pages.

Ma, et al., "Approaches for Neural-Network Language Model Adpatation", In Proceedings of 18th Annual Conference of the International Speech Communication Association, Aug. 20, 2017, pp. 259-263.

Zhang, et al., "Fast Gated Neural Domain Adaptation: Language Model as a Case Study", In Proceedings of CCOLING 2016 26th International Conference on Computational Linguistics: Technical Papers, Dec. 11, 2016, pp. 1386-1397.

Irie et al., "RADMM: Recurrent Adaptive Mixture Model with Applications to Domain Robust Language Modeling", In International Conference on Acoustics, Speech and Signal Processing, Apr. 15, 2018, pp. 6079-6083.

"International Search Report and Written Opinion Issued in PCT Application No. PCT/US20/020573", dated Jun. 25, 2020, 12 Pages.

* cited by examiner

MODULAR LANGUAGE MODEL ADAPTATION

TECHNICAL FIELD

Embodiments described herein generally relate to language modeling using machine learning and, in some embodiments, more specifically to modular language model adaptation.

BACKGROUND

Neural Networks have been used to create strong performing baselines in Language Modeling. With enough data, the temporal distribution learned by a single network may model a number of different scenarios with reasonable quality. However, some amount of tailoring is often required to model data-specific patterns.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
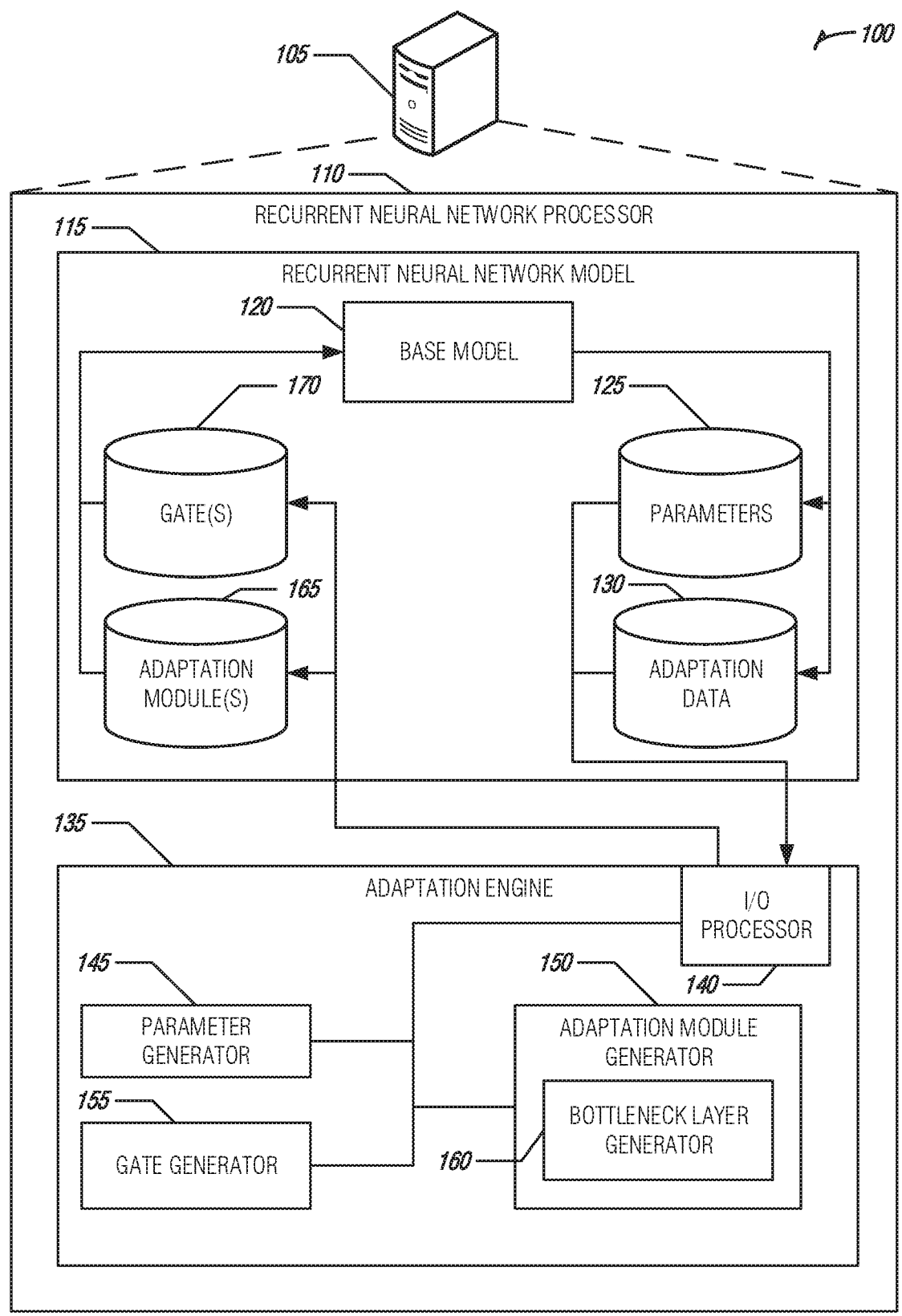
FIG. 1 is a block diagram of an example of a system for modular language model adaptation, according to an embodiment.

The success of neural networks (e.g., recurrent neural network (RNN), etc.) in language modeling and speech recognition, coupled with the availability of larger datasets has led to the production of large, robust models. These models have been both applied directly and used as foundations for pretraining targeted models. However, targeted applications of Language Models require a tailored approach. For tailored applications such as modeling a user's dialogue or a specific domain, updating the pretraining model to recognize entities and contexts found in these scenarios may produce great benefit. Furthermore, doing this in a way that minimally increases total parameter size is crucial for a production system that is modeling multiple scenarios at any given time.

Language modeling adaptation has been explored through various pretraining and finetuning techniques. Traditional techniques for language modeling may use parameter freezing and architectural strategies including freezing all model parameters but those in the softmax layer and training a new layer between a hidden layer and a softmax layer to learn data-specific patterns. As used herein, a softmax layer is a layer of a machine learning model that normalizes the output of previous layers into probabilities of for one or more labels. Some traditional techniques may train an additional embedding and hidden layer on adaptation data and combine the outputs from the same respective layer of the frozen pretrained model. The results may be combined via a learned gate to control information flow from the pretrained and adapted outputs when making a prediction. Some traditional techniques may bias a pretrained model towards an adaptation distribution. A cache probability may be learned as a function of the stored hidden states of words found in the adaptation set which may be interpolated with the pretrained neural network's word probabilities. In some traditional biasing techniques, the context meta data may be embedded and may be used to modulate the RNN and softmax layer outputs. In the RNN layer, the context embedding may be used to update the hidden state with k-lower rank matrices. In the softmax layer, it is multiplied by a learned weight matrix to bias the softmax logits. As used herein, logits are log probabilities output for a label given an input evaluated by the machine learning model. Traditional techniques for language modeling adaptation do not address the issues of linear model size growth and increased processing required to perform adaptations.

The systems and techniques discussed herein solve the problem of providing language adaptation to an RNN using adaptation modules that incorporates parameter freezing, probability biasing, and gating to produce a lightweight (e.g., less storage utilization, etc.) and effective (e.g., better results with less processing, etc.) solution. The adaptation modules may learn data specific distributions (e.g., subject matter, dialect, language, etc.) providing the adaptation modules to excel in its particular domain and, because they are lightweight (e.g., reduced size, limited parameter set, modular, etc.), may be used in sets to provide a scalable set of adaptations to improve the efficiency of the RNN in performing language processing tasks without substantially adding the storage footprint of the base RNN model. This is particularly effective when there is a budget for the number of additional parameters allowed for adaptation. Careful initialization and efficient learning strategies allow the module to learn a high quality local minimum while marginally increasing the size of the original parameter set. The use of interpolation with the pretrained model allows adaptation to be useful even on test data that isn't closely matched with the adaptation data.

The systems and techniques discussed herein may be applicable to a variety of language processing tasks such as, for example, language modeling, speech recognition, etc. The adaptation modules may be trained using appropriate adaptation training data for the task. For example, adaptation modules may be trained to create a personalized model for a user's writing in a text messaging application. In another example, adaptation modules trained for speech recognition may be used to model entities or parlance that a user may commonly evoke. Experimental results in the language modeling task show a perplexity reduction when using the described adaptation modules, while requiring only a fractional increase in the number of additional parameters learned. When combined with interpolation, the adaptation modules may outperform an unspecialized rescoring model in the speech recognition tasks.

FIG. 1 is a block diagram of an example of a system 100 for modular language model adaptation, according to an embodiment. The system 100 may be implemented in a computing device 105 (e.g., a computer, a cluster of computers, a cloud computing platform, an application-specific integrated circuit (ASIC), a field programmable gate array (FPGA), system on a chip (SoC), a mobile computing device, a smartphone, a wearable device, etc.). The system 100 may include a recurrent neural network (RNN) processor 110 that includes an RNN model 115. The RNN model may include a base model 120 that may output parameters that may be stored in parameter storage 125 and adaptation traing data that may be stored in adaptation data storage 130. The RNN model 115 may access adaptation module(s) storage 165 and gate(s) storage 170. An adaptation engine 135 may generate one or more adaptation modules and one or more gates for use by the RNN model 115. The one or more generated adaptation modules and the one or more generated gates may be stored, respectively, in the adaptation module(s) storage 165 and the gate(s) storage 170. The language model adaptation engine 135 may include a variety of components such as an input and output processor 140, a parameter generator 145, an adaptation module generator 150, and a gate generator 155. The adaptation module generator 150 may include a bottleneck generator 160.

The RNN processor 110 may provide language modeling functionality. The RNN processor 110 may learn a temporal model such as the base model 120 to predict a sequence of labels $y=(y_1, \ldots, y_T)$ from corresponding inputs $x=(x_1, \ldots, x_T)$ and hidden states $h=(h_1, \ldots, h_t)$. Inputs may be received by the RNN processor 110 and the RNN model 115 may evaluate the inputs to produce a set of outputs. For example, text strings may be received as input and a set of words contained in the text strings may be output based on the evaluation. In an example, the output may be based on probabilities of various possible results identified within the text strings determined during the evaluation.

Figure 2:
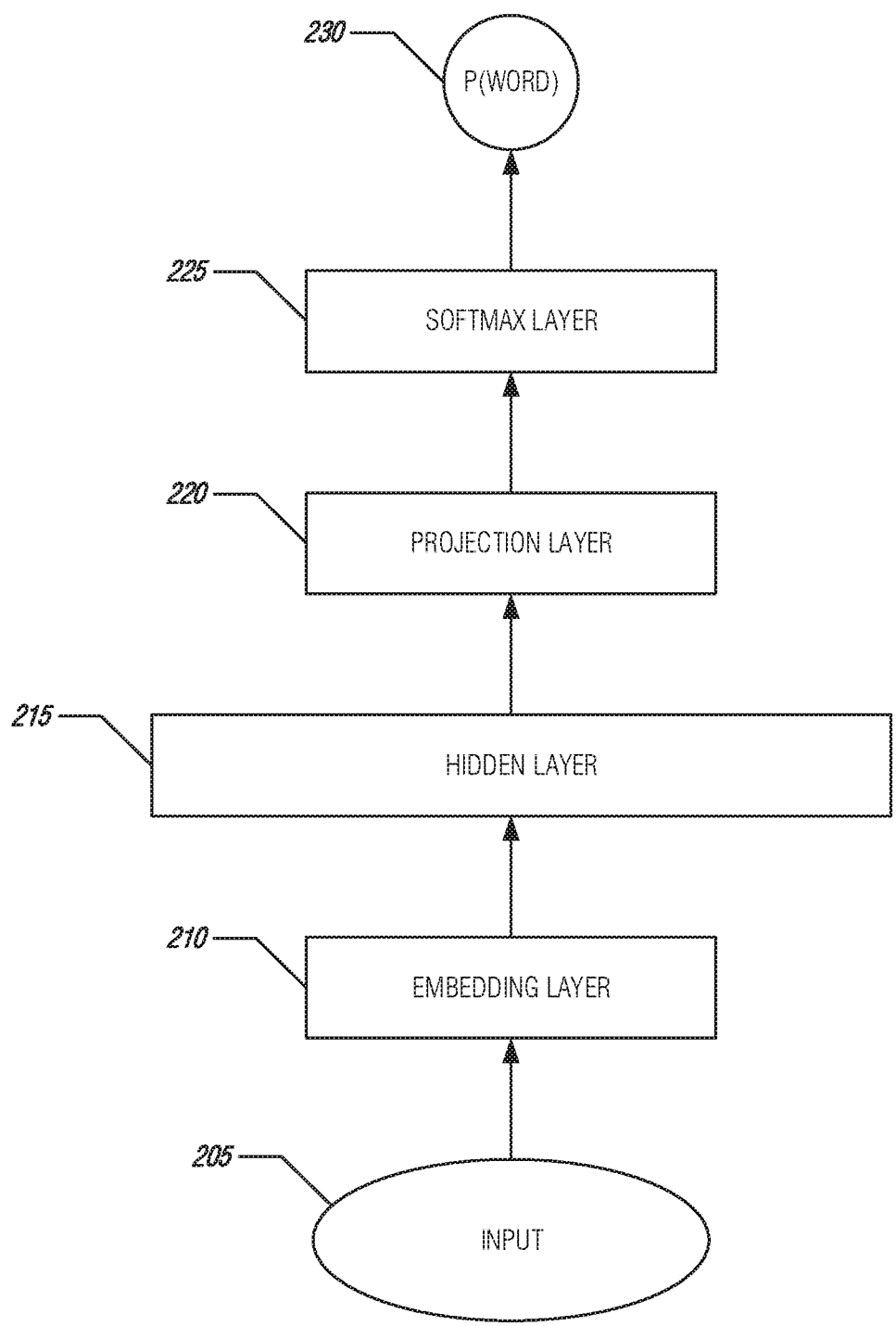
FIG. 2 illustrates a bock diagram of an example of a base model for modular language model adaptation, according to an embodiment.

FIG. 2 illustrates a block diagram 200 of an example of a base model (e.g., base model 120 as described in FIG. 1, etc.) for modular language model adaptation, according to an embodiment. Block diagram 200 shows the architecture of a single-layer recurrent neural network with a projection layer for one timestep. The base model shown in block diagram 200 may be an example of the base model 120 as described in FIG. 1.

Inputs may be received at an input layer 205. The inputs may be embedded by an embedding layer 210. The inputs and labels may be expressed as one-hot encodings (e.g., converted to machine learning processor readable form, etc.) corresponding to the words that they represent, and the hidden states in hidden layer 215 may be used to summarize the context up to the current word.

$$x_t = 1(X_t = word_t) \quad (1)$$

$$y_t = 1(Y_t = label_t) \quad (2)$$

$$e_t^0 = W_e x_t + b_e \quad (3)$$

$$h_t^l = F(e_t^{l-1}, h_{t-1}^l, W_h^l, b_h^l) \quad (4)$$

$$l_t = W_S h_t^L + b_S \quad (5)$$

$$y_t = \sigma(l_t) \quad (6)$$

The high-dimensional inputs are first compressed into a lower dimensional embedding $e_t^0$ using weights $W_e$ and bias $b_e$. The recurrence function F composes the inputs from the prior layer $e_t^{l-1}$ with the prior hidden states $h_{t-1}^l$, at each layer of the network. Long short-term memory (LSTM) recurrence functions employ an effective mechanism for retaining memory via their cell state and are used to represent F. The outputs of the final hidden layer L are fed into a projection layer 220 followed by a fully connected softmax layer 225 with weights $W_S$ and bias $b_S$ to produce the logits. Applying a softmax function over the logits results in probability predictions 230 for the labels.

Returning to the description of FIG. 1, a set of adaptation training data and a set of parameters from the RNN model 115 (e.g., from the parameter storage 125 and adaptation data storage 130, etc.) may be received by the input and output processor 140. In an example, the set of parameters are received from the base model 120 of the recurrent neural network. For example, the set of parameters may include a set (or subset) of parameters used by the base model 120 to produce an output related to an item of adaptation training data and the adaptation training data may include a set of data specific to a domain for which an adaptation module is to be trained. For example, the base model 120 may be pretrained for English language modeling and a set of adaptation training data with words and phrases in United Kingdom (UK) English may be received as the set of adaptation training data and the set of parameters may be parameters used by the base model 120 to evaluate the adaptation training data. In an example, the base model 120 may be a long short-term memory network layers of a group of layers comprising: an embedding layer, a hidden layer, and a projection layer.

The parameter generator 145 may determine a set of adaptation parameters using the set of adaptation training data. For example, the parameter generator 145 may consume the set of adaptation training data including UK English words and phrases to identify a set of adaptation module parameters that provide the lowest perplexity and may use the adaptation module parameters to assemble a network of neurons for predicting words and phrases in subsequent inputs.

The adaptation module generator 150 may modify a set of outputs of the RNN model 115 using output of an evaluation of the set of adaptation data using the set of adaptation parameters. The adaptation module generator 150 may generate an adaptation module including a set of adaptation module parameters based on the modified set of outputs. In an example, generation of the adaptation module may include backpropagating a set of errors determined by an objective function between the modified set of outputs and a set of true labels to determine the set of adaptation module parameters. For example, the adaptation module may be generated using the parameters and neurons identified and generated by the parameter generator based on the perplexity results of the evaluation. For example, if the adaptation module produces a lower perplexity for the data set than the base model 120, the adaptation module may be generated to allow the base model 120 to leverage the adaptation module to enhance evaluation of future inputs.

The bottleneck layer generator 160 may generate a bottleneck layer using a subset of the set of adaptation module parameters and the adaptation module generator 150 may add the bottleneck layer to the adaptation module. The bottleneck layer may be a reduced parameter filter that may be used to evaluate inputs before they reach the full adaptation module. This may allow reduced processing by reducing the number of neurons that are activated to produce an output.

The adaptation module may be added by the input and output processor 140 to the RNN model 115 for evaluating inputs corresponding to the set of adaptation module parameters. For example, the adaptation module may be added to the adaptation module(s) storage 165. The RNN model 115 may then access the adaptation module to enhance evaluation of future inputs.

The adaptation module may be used by the RNN processor 110 when evaluating inputs using the RNN model 115. A set of input data using the base model 120 of the recurrent neural network. The adaptation module may be selected based on the evaluation of the set of input data and a set of output values may be determined for the set of input data by evaluating a set of base model outputs generated by the base model 120 using the set of parameters and a set of adaptation outputs generated by the adaptation module using the set of adaptation module parameters. In an example, the set of base model outputs may be received from a first softmax layer of the base model 120 and the set of adaptation outputs is received from a second softmax layer of the adaptation module.

In an example, an initial value of each parameter of the set of adaptation module parameters may be set where the initial value preserves the initial output of the recurrent neural network model. A composition function may be applied to the set of base outputs and the set of adaptation outputs and output of the composition function may be evaluated using a softmax function to determine the set of output values.

Figure 3:
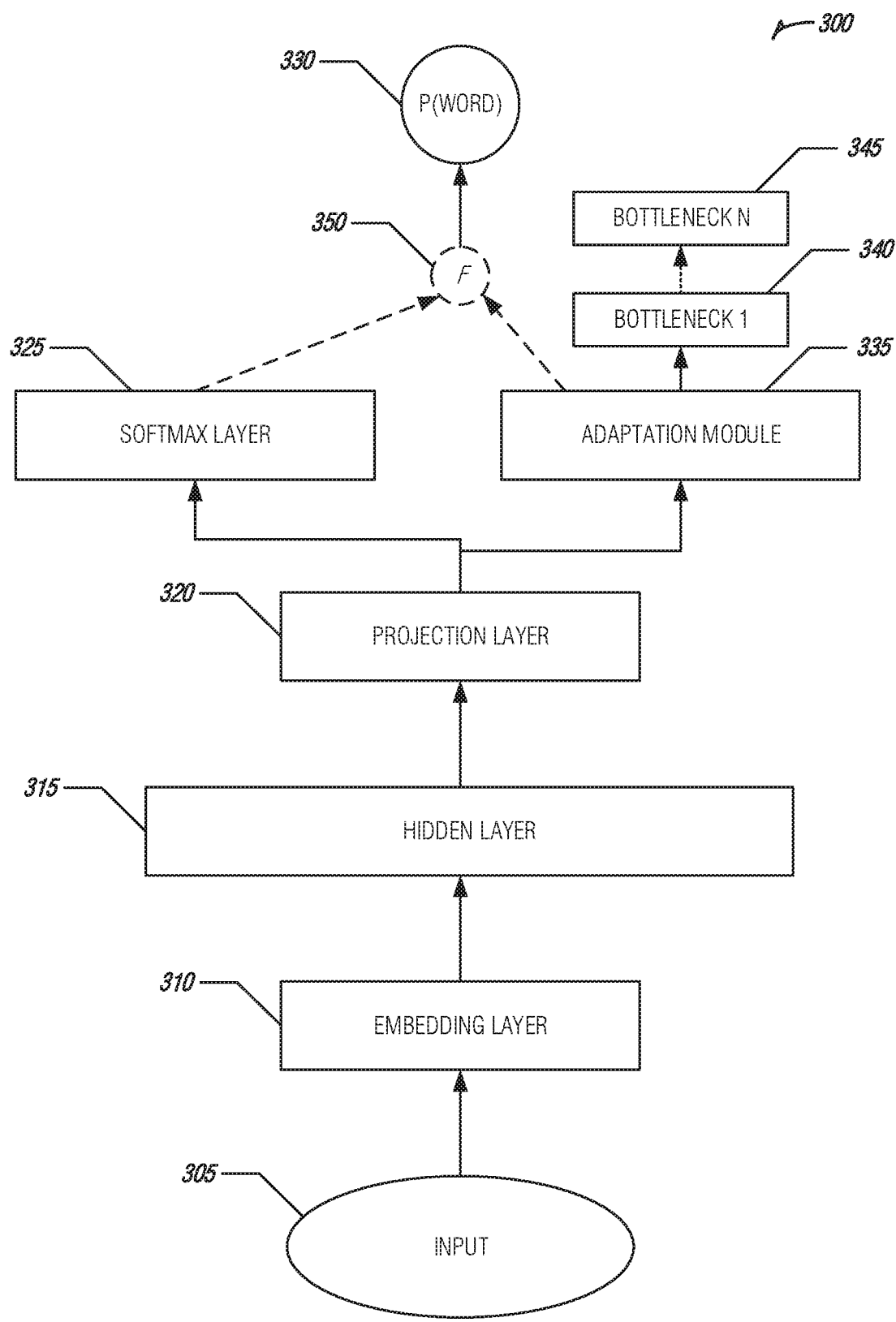
FIG. 3 illustrates a bock diagram of an example of an adaptation module working in conjunction with a base model for modular language model adaptation, according to an embodiment.

FIG. 3 illustrates a block diagram 300 of an example of an adaptation module working in conjunction with a base model for modular language model adaptation, according to an embodiment. Block diagram 300 illustrates an adaptation module 335 (e.g., as generated by the adaptation module generator 150 as described in FIG. 1) overlaid on a frozen pretrained model (e.g., base model 120 as described in FIG. 1). The frozen pretrained model (e.g., base model 120 as described in FIG. 1) may include an input layer 305 (e.g., input layer 205 as described in FIG. 2, etc.), an embedding layer 310 (e.g., embedding layer 210 as described in FIG. 2, etc.), a hidden layer 315 (e.g., hidden layer 215 and described in FIG. 2, etc.), a projection layer 320 (e.g., projection layer 220 as described in FIG. 2, etc.), and a softmax layer 325 (e.g., softmax layer 225 as described in FIG. 2, etc.).

The adaptation module may add an additional softmax layer for the adaptation module 335 over the final hidden state layer (e.g., projection layer 320), outputting its own set of logits $l_{A,t}$. It may be understood that other differentiable models may be used to represent the adaptation module. While the example in block diagram 300 shows the adaptation module 335 over the final hidden state layer, it may be understood the that the adaptation module 335 may be place at various layers throughout the pretrained model to enhance evaluation of the layer through adaptation.

In the block diagram 300, the adaptation module is represented by one or more fully-connected layers. The output logits from adaptation $l_{A,t}$ are composed with the original logits $l_t$ using a composition function $f$ in the composition function layer 350 before being fed into a final softmax function to produce the word predictions 330. The composition function $f$ may be represented by a variety of differentiable functions. For example, addition may allow for more calibrated parameter initialization.

$$l_{A,t}=A(h_t^L, W_A, b_A) \quad (7)$$

$$l_{O,t}=f(l_t, l_{A,t}) \quad (8)$$

$$y_t=\sigma(l_{O,t}) \quad (9)$$

Many real-time services may be constrained by latency and model size limitations. As a result, fetching and loading bulky models for adaptation may be prohibitive. The adaptation module may be constructed and trained to learn a marginal amount of additional parameters.

Modern applications of word-based language models may demand being able to predict large vocabularies of words. In these cases, the majority of the model parameters may be used to learn the embedding and softmax layer and the overall model size tends to grow linearly with the vocabulary size |V|. The systems and techniques described herein prevent linear growth of the model size by specifically training the adaptation module to update only parameters corresponding to words found in the adaptation data. Because the vocabulary size for the adaptation data may be up to an order of magnitude smaller than that of the pretraining data, this may substantially reduce the number of additional parameters that need to be learned. Further parameter reduction may be obtained by inserting a fully-connected bottleneck layer 340 (e.g., as generated by the bottleneck layer generator 160 described in FIG. 1) before logits are calculated. Additional bottlenecks 345 may be added to further refine adaptation module parameters. Depending on the size of the original pretrained model, the quantity of parameters learned may be reduced by an additional order of magnitude with a minimal impact on accuracy.

To ensure that the adaptation module 335 learns to correct mistakes made by the original pretrained model, the pretrained model's parameters may be frozen during adaptation. The adaptation module 335 may also be carefully initialized to be able to learn a quality local minimum from a limited amount of adaptation data. At the start of training, the adaptation module parameters may be initialized so that the output logits $l_{O,t}$ equal the pretrained logits $l_t$. For example, if the composition function $f$ is addition, the adaptation module parameters $W_A$ and $b_A$ may be initialized to zero. This may assure that adaptation will perform no worse than not adapting.

Returning to the description of FIG. 1, in an example, adaptation module selection may be performed by a gate trained over a hidden layer output of the base model 120 of the recurrent neural network. In an example, a set of pretraining data may be received by the gate generator 155 (e.g., via the input and output processor 140) and the gate may be trained using the set of pretraining data and the set of adaptation training data. The training may allow the gate to predict whether input data corresponds to the set of pretraining data or the set of adaptation training data. In an example, selecting the adaptation module may include evaluating the set of input data using the gate. For example, the gate may identify a variant "colour" in the inputs and may select an adaptation module for UK English to be used in conjunction with the English language base model 120.

Figure 4:
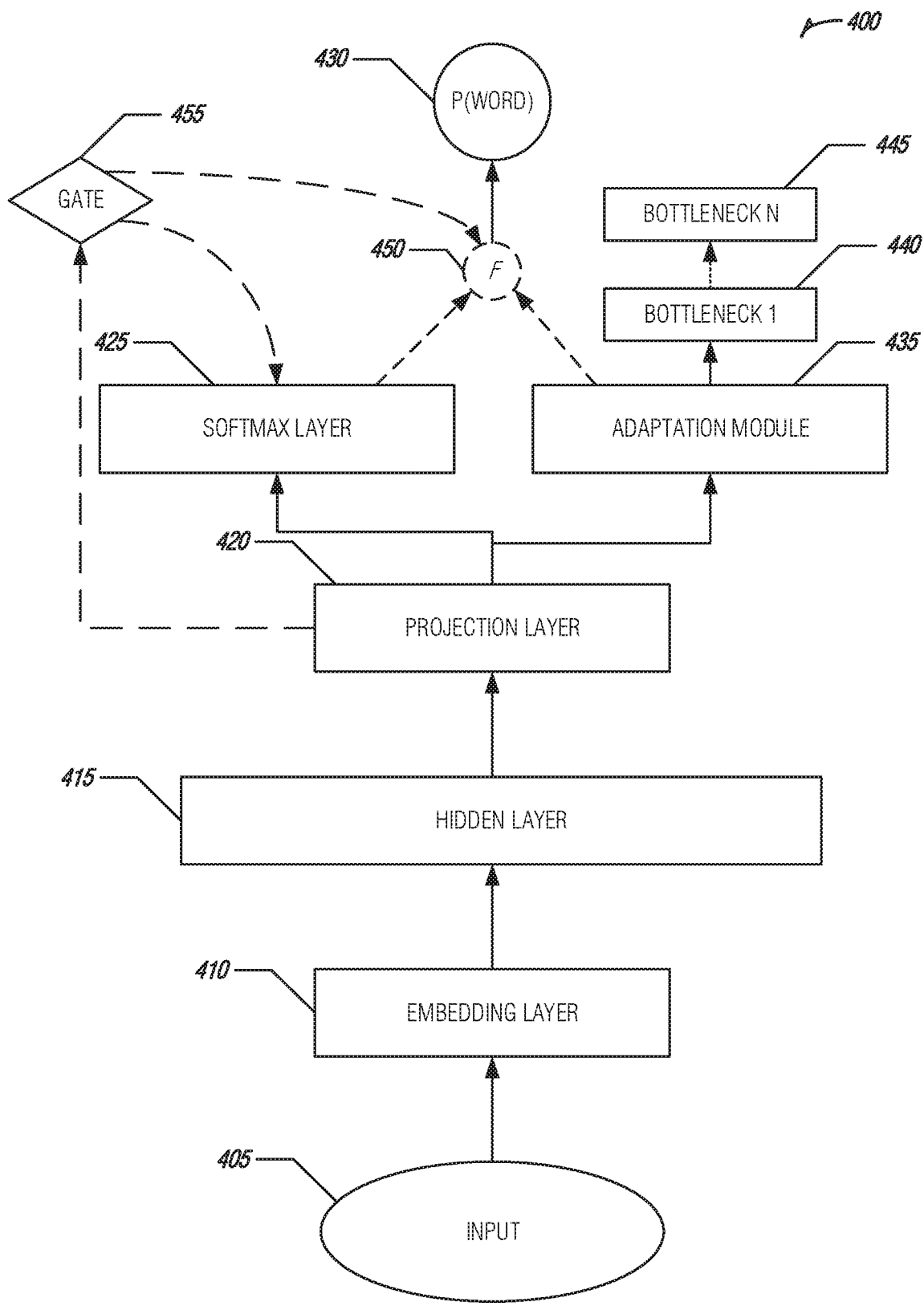
FIG. 4 illustrates a bock diagram of an example of a gate working in conjunction with an adaptation module and a base model for modular language model adaptation, according to an embodiment.

FIG. 4 illustrates a block diagram 400 of an example of a gate (e.g., as generated by the gate generator 155 as described in FIG. 1) working in conjunction with an adaptation module (e.g., as generated by the adaptation module generator 150 as described in FIG. 1 and shown in FIG. 3) and a base model (e.g., based model 120 as described in FIG. 2) for modular language model adaptation, according to an embodiment. Block diagram 400 shows a gating mechanism 455 weighing the base model (e.g., pretrained model) and adaptation module (e.g., adapted model, etc.) output.

The block diagram 400 includes an adaptation module 435 (e.g., as generated by the adaptation module generator 150 as described in FIG. 1 and adaptation module 335 as described in FIG. 3) overlaid on the pretrained base model. The pretrained base model may include an input layer 405 (e.g., input layer 205 as described in FIG. 2, input layer 305 as described in FIG. 3, etc.), an embedding layer 410 (e.g., embedding layer 210 as described in FIG. 2, embedding layer 310 as described in FIG. 3, etc.), a hidden layer 415 (e.g., hidden layer 215 and described in FIG. 2, hidden layer 315 and described in FIG. 3, etc.), a projection layer 420 (e.g., projection layer 220 as described in FIG. 2, projection layer 320 as described in FIG. 3, etc.), and a softmax layer 425 (e.g., softmax layer 225 as described in FIG. 2, softmax layer 325 as described in FIG. 3, etc.).

Training the gate 455 to determine in which contexts to adaptation should be applied may reduce data mismatches between adaptation and evaluation data. During training, batches mixed with pretraining and adaptation data are input into the gate 455. Corresponding hidden states are then extracted from the base model and used as input to the gate 455 to predict if the context comes from the pretraining or adaptation data. In an example, a fully connected feedforward network may be used as the gate 455. In an example, the gate 455 may have a single hidden layer. In an example, the gate 455 may use gradient-based optimization (e.g., Adagrad, etc.) to optimize. In an example, a dropout rate may be applied to the gate 455 during training to provide regularization.

$$z_t = 1(word_t \in adaptationdata) \quad (10)$$

$$z_t = I(W_{interp}, b_{interp}, h_t^l) \quad (11)$$

At evaluation, the gate 455 emits an interpolation weight for the current context, $\pi_t$, and the new prediction becomes:

$$y_t = \pi_t \sigma(l_{o,t}) + (1-\pi_t)\sigma(1_t) \quad (12)$$

Interpolation may reduce confidence for adaptation-specific words but may increase confidence for more general words. Because general words occur more frequently, the overall word-error rate (WER) in a speech recognition scenario is improved. In instances where the size of the adaptation module is unconstrained and the pretrained base model is allowed to update all its parameters on the adaptation data before rescoring, WER results of speech recognition tasks improve over the original WER results. However, the interpolated adaptation module shows equivalent improvements while training a fraction of the parameters. The outputs of the softmax layer 425 and the adaptation module 435 may be fed into composition function layer 450 (e.g., composition function layer 350 as described in FIG. 3, etc.) before being fed into a final softmax function to produce the word predictions 430 (e.g., word predictions 230 as described in FIG. 2, word predictions 330 as described in FIG. 3, etc.) if it is determined by the gate 455 that one or more adaptation modules should be selected to evaluate the inputs. The bottleneck 440 and other bottlenecks 445 may be applied to the adaptation module 435 (e.g., as described in FIG. 3, etc.).

Returning to the description of FIG. 1, one or more gates and a collection of adaptation modules may be available (e.g., from the adaptation module(s) storage 165, gate(s) storage 170, etc.) to the RNN model 115. The RNN model 155 may select multiple adaptation modules to evaluate inputs where a gate determines that the inputs are suitable for evaluation respective to the multiple adaptation modules.

The RNN model 115 may evaluate a set of input data using the base model 120 of the RNN 115. The adaptation module may be selected for evaluating a first subset of the set of input data and another adaptation module may be selected for evaluating a second subset of the set of input data based on the evaluation of the set of input data. A set of output values may be determined for the set of input data by applying a composition function to a set of base model outputs generated by the base model 120 using the set of parameters, a first set of adaptation outputs generated by the adaptation module using the set of adaptation module parameters, and a second set of adaptation outputs generated by the other adaptation module using another set of adaptation module parameters. In an example, an initial value of each parameter of the set of adaptation module parameters and the other set of adaptation module parameters may be set where the initial value preserves the initial output of the recurrent neural network model. The output of the composite function may be evaluated using a softmax function to determine the set of output values. For example, a first pass evaluation may use limited initial values to produce an output that may have been produced without adaptation and a second pass may use the fully initialized adaptation module values to produce a fully adapted output. This limits the risk of adaptation degrading performance of the base model 120.

In an example, the RNN model 115 including the adaptation module may be transmitted to a machine learning processor to evaluate a set of language inputs. A set of language outputs may be generated by the RNN model 115 including the adaptation module. For example, the RNN model 115 may be transmitted to a mobile device to label received inputs from the mobile device. In another example, the adaptation modules may be transmitted to a computing device that contains the base model 120. This may allow the lightweight adaptation modules to be transmitted to the computing device to improve the performance of the RNN model 115 without transmitting an entirely new model to the computing device. This may save bandwidth by transmitting the smaller adaptation modules rather than full models and may reduce data storage at the computing device by reducing the need for large parameterized models for domain specific language modeling tasks.

Figure 5:
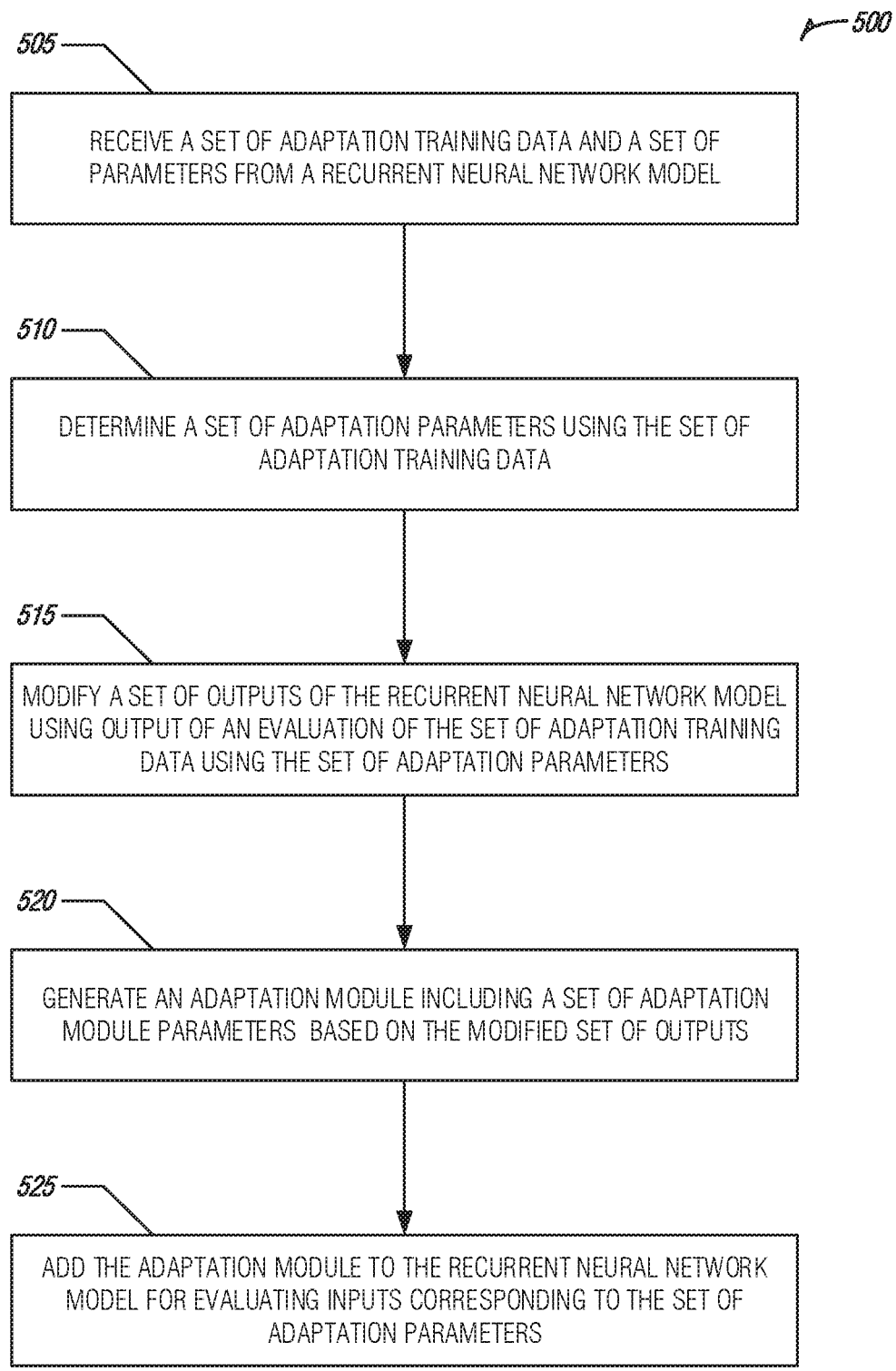
FIG. 5 illustrates a flow diagram of an example of a method for modular language model adaptation, according to an embodiment.

FIG. 5 illustrates an example of a method 500 for modular language model adaptation, according to an embodiment. The method 500 may provide features as described in FIGS. 1-4.

A set of adaptation training data and a set of parameters may be received (e.g., by the input and output processor 140 as described in FIG. 1, etc.) from a recurrent neural network model (e.g., at operation 505). In an example, the set of parameters may be received from the base model of the recurrent neural network. A set of adaptation parameters may be determined using the set of adaptation training data (e.g., at operation 510). A set of outputs of the recurrent neural network model may be modified (e.g., by the parameter generator 145 as described in FIG. 1, etc.) using output of an evaluation of the set of adaptation training data using the set of adaptation parameters (e.g., at operation 515). A set of errors determined by an objective function between the set of outputs and set of true labels may be backpropagated to determine a set of adaptation parameters.

An adaptation module including a set of adaptation module parameters may be generated (e.g., by the adaptation module generator 150 as described in FIG. 1, etc.) based on the modified set of outputs (e.g., at operation 520). In an example, generation of the adaptation module may include backpropagating a set of errors determined by an objective function between the modified set of outputs and a set of true labels to determine the set of adaptation module parameters. In an example, a bottleneck layer may be generated (e.g., by the bottleneck layer generator 160 as described in FIG. 1, etc.) using a subset of the set of adaptation module parameters and the bottleneck layer may be added to the adaptation module.

The adaptation module may be added (e.g., by the input and output processor 140 as described in FIG. 1, etc.) to the recurrent neural network model for evaluating inputs corresponding to the set of adaptation module parameters (e.g., at operation 525). In an example, the recurrent neural network model including the adaptation module may be transmitted to a machine learning processor to evaluate a set of language inputs where a set of language outputs may be generated by the recurrent neural network model including the adaptation module.

In an example, a set of input data may be evaluated using a base model of the recurrent neural network. The adaptation module may be selected based on the evaluation of the set of input data and a set of output values may be determined for the set of input data by evaluating a set of base model outputs generated by the base model using the set of parameters and a set of adaptation outputs generated by the adaptation module using the set of adaptation module parameters. In an example, the set of base model outputs may be received from a first softmax layer of the base model and the set of adaptation outputs is received from a second softmax layer of the adaptation module. In an example, the base model may be a long short-term memory network comprising an embedding layer, a hidden layer, and a projection layer.

In an example, the adaptation module may be selected by a gate trained over a hidden layer output of the base model of the recurrent neural network. In an example, a set of pretraining data may be received and a gate may be trained (e.g., by the gate generator 155 as described in FIG. 1, etc.) using the set of pretraining data and the set of adaptation training data where the training allows the gate to predict whether input data corresponds to the set of pretraining data or the set of adaptation training data. In an example, the adaptation module is selected by evaluation of the set of input data using the gate.

In an example, an initial value of each parameter of the set of adaptation module parameters may be set where the initial value preserves the initial output of the recurrent neural network model. A composition function may be applied to the set of base outputs and the set of adaptation outputs and output of the composition function may be evaluated using a softmax function to determine the set of output values.

In an example, a set of input data may be evaluated using a base model of the recurrent neural network. The adaptation module may be selected for evaluating a first subset of the set of input data and another adaptation module for evaluating a second subset of the set of input data based on the evaluation of the set of input data. A set of output values may be determined for the set of input data by applying a composition function to a set of base model outputs generated by the base model using the set of parameters, a first set of adaptation outputs generated by the adaptation module using the set of adaptation module parameters, and a second set of adaptation outputs generated by the other adaptation module using another set of adaptation module parameters. In an example, an initial value of each parameter of the set of adaptation module parameters and the other set of adaptation module parameters may be set where the initial value preserves the initial output of the recurrent neural network model. The output of the composite function may be evaluated using a softmax function to determine the set of output values.

Figure 6:
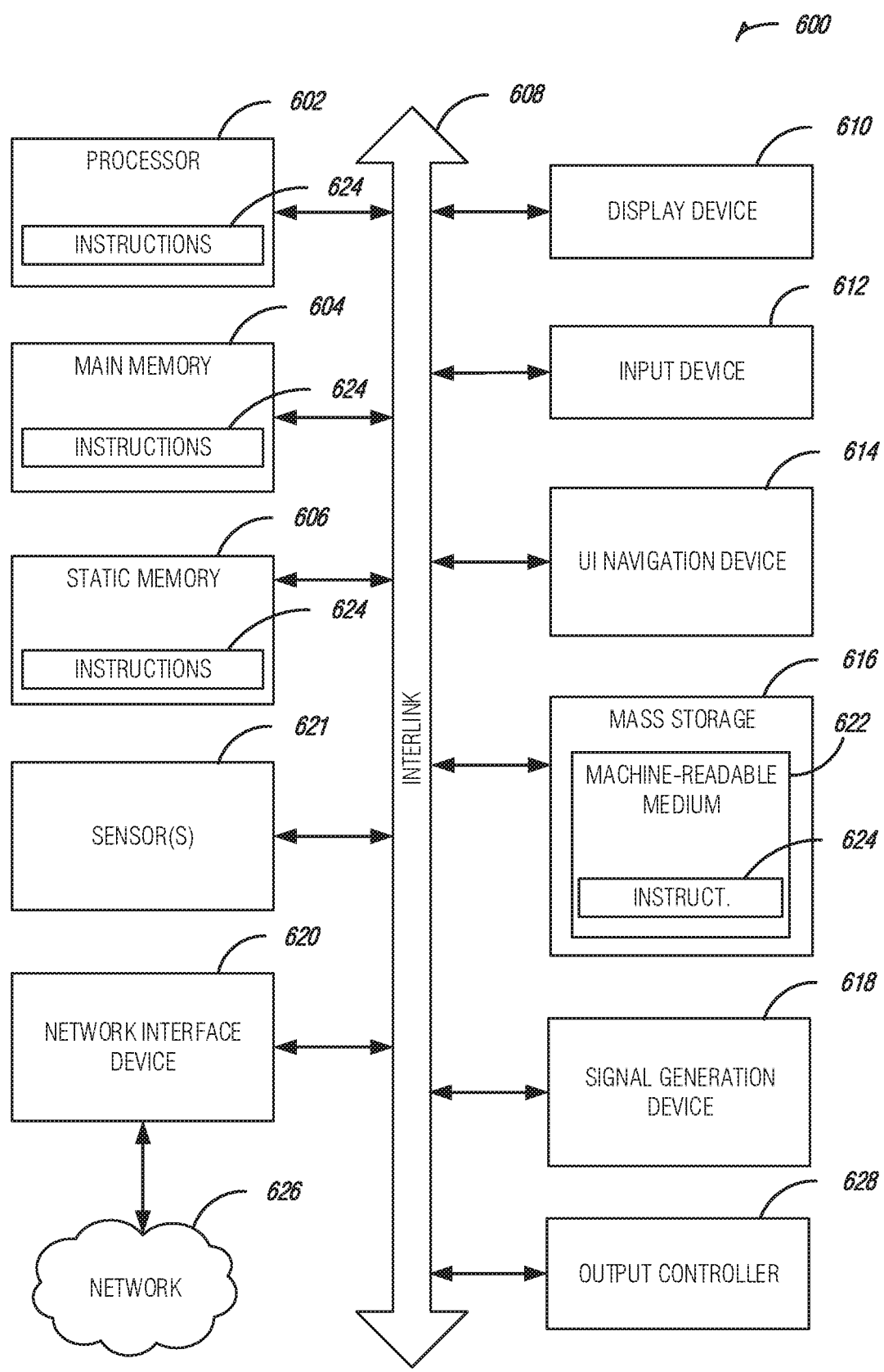
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensors. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, etc.), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

ADDITIONAL NOTES & EXAMPLES

Example 1 is a system for language model adaptation, the system comprising: at least one processor; and memory including instructions that, when executed by the at least one processor, cause the at least one processor to perform operations to: receive a set of adaptation training data and a set of parameters from a recurrent neural network model; determine a set of adaptation parameters using the set of adaptation training data; modify a set of outputs of the recurrent neural network model using output of an evaluation of the set of adaptation training data using the set of adaptation parameters; generate an adaptation module that includes, a set of adaptation module parameters based on the modified set of outputs, wherein generating the adaptation module includes backpropagating a set of errors determined by an objective function between the modified set of outputs and a set of true labels to determine the set of adaptation module parameters; and add the adaptation module to the recurrent neural network model for evaluation of inputs corresponding to the set of adaptation module parameters.

In Example 2, the subject matter of Example 1 includes, instructions that, when executed by the at least one processor, further cause the at least one processor to perform operations to: evaluate a set of input data using a base model of the recurrent neural network; select the adaptation module based on the evaluation of the set of input data; and determine a set of output values for the set of input data by evaluating a set of base model outputs generated by the base model using the set of parameters and a set of adaptation outputs generated by the adaptation module using the set of adaptation module parameters.

In Example 3, the subject matter of Example 2 includes, wherein the instructions to select the adaptation module include instructions to train a gate over a hidden layer output of the base model of the recurrent neural network.

In Example 4, the subject matter of Examples 2-3 includes, wherein the instructions to determine the set of output values further comprises instructions to: set an initial value of each parameter of the set of adaptation parameters, wherein the initial value preserves the initial output of the recurrent neural network model; apply a composition function to the set of base outputs and the set of adaptation outputs; and evaluate output of the composition function using a softmax function to determine the set of output values.

In Example 5, the subject matter of Examples 2-4 includes, wherein the set of base model outputs are received from a first softmax layer of the base model and the set of adaptation outputs is received from a second softmax layer of the adaptation module.

In Example 6, the subject matter of Examples 2-5 includes, wherein the base model is a long short-term memory network comprising an embedding layer, a hidden layer, and a projection layer.

In Example 7, the subject matter of Examples 2-6 includes, instructions that, when executed by the at least one processor, further cause the at least one processor to perform operations to: receive a set of pretraining data; and train a gate using the set of pretraining data and the set of adaptation training data, wherein the trained gate predicts whether input data corresponds to the set of pretraining data or the set of adaptation training data.

In Example 8, the subject matter of Example 7 includes, wherein the instructions to select the adaptation module further comprises instructions to evaluate the set of input data using the gate.

In Example 9, the subject matter of Examples 1-8 includes, instructions that, when executed by the at least one processor, further cause the at least one processor to perform operations to: transmit the recurrent neural network model including the adaptation module to a machine learning processor to evaluate a set of language inputs, wherein a set of language outputs are generated by the recurrent neural network model that includes the adaptation module.

In Example 10, the subject matter of Examples 1-9 includes, wherein the instructions to generate the adaptation module further comprises instructions to: generate a bottleneck layer using a subset of the set of adaptation module parameters; and add the bottleneck layer to the adaptation module.

In Example 11, the subject matter of Examples 1-10 includes, wherein the set of parameters are received from the base model of the recurrent neural network.

In Example 12, the subject matter of Examples 1-11 includes, instructions that, when executed by the at least one processor, further cause the at least one processor to perform operations to: evaluate a set of input data using a base model of the recurrent neural network; select the adaptation module for evaluating a first subset of the set of input data and another adaptation module for evaluating a second subset of the set of input data based on the evaluation of the set of input data; and determine a set of output values for the set of input data by applying a composition function to a set of base model outputs generated by the base model using the set of parameters, a first set of adaptation outputs generated by the adaptation module using the set of adaptation module parameters, and a second set of adaptation outputs generated by the other adaptation module using another set of adaptation module parameters.

In Example 13, the subject matter of Example 12 includes, wherein the instructions to determine the set of output values further comprises instructions to: set an initial value of each parameter of the set of adaptation module parameters and the other set of adaptation module parameters, wherein the initial value preserves the initial output of the recurrent neural network model; and evaluate output of the composite function using a softmax function to determine the set of output values.

Example 14 is a method for language model adaptation, the method comprising: receiving a set of adaptation training data and a set of parameters from a recurrent neural network model, determining a set of adaptation parameters using the set of adaptation training data; modifying a set of outputs of the recurrent neural network model using output of an evaluation of the set of adaptation training data using the set of adaptation parameters; generating an adaptation module including a set of adaptation module parameters based on the modified set of outputs, wherein generating the adaptation module includes, backpropagating a set of errors determined by an objective function between the modified set of outputs and a set of true labels to determine the set of adaptation module parameters; and adding the adaptation module to the recurrent neural network model for evaluating inputs corresponding to the set of adaptation module parameters.

In Example 15, the subject matter of Example 14 includes, evaluating a set of input data using a base model of the recurrent neural network; selecting the adaptation module based on the evaluation of the set of input data; and determining a set of output values for the set of input data by evaluating a set of base model outputs generated by the base model using the set of parameters and a set of adaptation outputs generated by the adaptation module using the set of adaptation module parameters.

In Example 16, the subject matter of Example 15 includes, wherein selecting the adaptation module is performed by a gate trained over a hidden layer output of the base model of the recurrent neural network.

In Example 17, the subject matter of Examples 15-16 includes, wherein determining the set of output values further comprises: setting an initial value of each parameter of the set of adaptation parameters, wherein setting the initial value preserves the initial output of the recurrent neural network model; applying a composition function to the set of base outputs and the set of adaptation outputs; and evaluating output of the composition function using a softmax function to determine the set of output values.

In Example 18, the subject matter of Examples 15-17 includes, wherein the set of base model outputs are received from a first softmax layer of the base model and the set of adaptation outputs is received from a second softmax layer of the adaptation module.

In Example 19, the subject matter of Examples 15-18 includes, wherein the base model is a long short-term memory network comprising an embedding layer, a hidden layer, and a projection layer.

In Example 20, the subject matter of Examples 15-19 includes, receiving a set of pretraining data; and training a gate using the set of pretraining data and the set of adaptation training data, wherein the training allows the gate to predict whether input data corresponds to the set of pretraining data or the set of adaptation training data.

In Example 21, the subject matter of Example 20 includes, wherein selecting the adaptation module further comprises evaluating the set of input data using the gate.

In Example 22, the subject matter of Examples 14-21 includes, transmitting the recurrent neural network model including the adaptation module to a machine learning processor to evaluate a set of language inputs, wherein a set of language outputs are generated by the recurrent neural network model including the adaptation module.

In Example 23, the subject matter of Examples 14-22 includes, wherein generating the adaptation module further comprises: generating a bottleneck layer using a subset of the set of adaptation module parameters; and adding the bottleneck layer to the adaptation module.

In Example 24, the subject matter of Examples 14-23 includes, wherein the set of parameters are received from the base model of the recurrent neural network.

In Example 25, the subject matter of Examples 14-24 includes, evaluating a set of input data using a base model of the recurrent neural network; selecting the adaptation module for evaluating a first subset of the set of input data and another adaptation module for evaluating a second subset of the set of input data based on the evaluation of the set of input data; and determining a set of output values for the set of input data by applying a composition function to a set of base model outputs generated by the base model using the set of parameters, a first set of adaptation outputs generated by the adaptation module using the set of adaptation module parameters, and a second set of adaptation outputs generated by the other adaptation module using another set of adaptation module parameters.

In Example 26, the subject matter of Example 25 includes, wherein determining the set of output values further comprises: setting an initial value of each parameter of the set of adaptation module parameters and the other set of adaptation parameters, wherein setting the initial value preserves the initial output of the recurrent neural network model; and evaluating output of the composite function using a softmax function to determine the set of output values.

Example 27 is at least one machine-readable storage medium including instructions for language model adaptation that, when executed by at least one processor, cause the at least one processor to perform operations to: receive a set of adaptation training data and a set of parameters from a recurrent neural network model; determine a set of adaptation parameters using the set of adaptation training data; modify a set of outputs of the recurrent neural network model using output of an evaluation of the set of adaptation training data using the set of adaptation parameters; generate an adaptation module that includes, a set of adaptation module parameters based on the modified set of outputs, wherein generating the adaptation module includes back-propagating a set of errors determined by an objective function between the modified set of outputs and a set of true labels to determine the set of adaptation module parameters; and add the adaptation module to the recurrent neural network model for evaluation of inputs corresponding to the set of adaptation module parameters.

In Example 28, the subject matter of Example 27 includes, instructions that, when executed by the at least one processor, further cause the at least one processor to perform operations to: evaluate a set of input data using a base model of the recurrent neural network; select the adaptation module based on the evaluation of the set of input data; and determine a set of output values for the set of input data by evaluating a set of base model outputs generated by the base model using the set of parameters and a set of adaptation outputs generated by the adaptation module using the set of adaptation module parameters.

In Example 29, the subject matter of Example 28 includes, wherein the instructions to select the adaptation module include instructions to train a gate over a hidden layer output of the base model of the recurrent neural network.

In Example 30, the subject matter of Examples 28-29 includes, wherein the instructions to determine the set of output values further comprises instructions to: set an initial value of each parameter of the set of adaptation module parameters, wherein the initial value preserves the initial output of the recurrent neural network model; apply a composition function to the set of base outputs and the set of adaptation outputs; and evaluate output of the composition function using a softmax function to determine the set of output values.

In Example 31, the subject matter of Examples 28-30 includes, wherein the set of base model outputs are received from a first softmax layer of the base model and the set of adaptation outputs is received from a second softmax layer of the adaptation module.

In Example 32, the subject matter of Examples 28-31 includes, wherein the base model is a long short-term memory network comprising an embedding layer, a hidden layer, and a projection layer.

In Example 33, the subject matter of Examples 28-32 includes, instructions that, when executed by the at least one processor, further cause the at least one processor to perform operations to: receive a set of pretraining data; and train a gate using the set of pretraining data and the set of adaptation training data, wherein the trained gate predicts whether input data corresponds to the set of pretraining data or the set of adaptation training data.

In Example 34, the subject matter of Example 33 includes, wherein the instructions to select the adaptation module further comprises instructions to evaluate the set of input data using the gate.

In Example 35, the subject matter of Examples 27-34 includes, instructions that, when executed by the at least one processor, further cause the at least one processor to perform operations to: transmit the recurrent neural network model including the adaptation module to a machine learning processor to evaluate a set of language inputs, wherein a set of language outputs are generated by the recurrent neural network model that includes the adaptation module.

In Example 36, the subject matter of Examples 27-35 includes, wherein the instructions to generate the adaptation module further comprises instructions to: generate a bottleneck layer using a subset of the set of the adaptation module parameters; and add the bottleneck layer to the adaptation module.

In Example 37, the subject matter of Examples 27-36 includes, wherein the set of parameters are received from the base model of the recurrent neural network.

In Example 38, the subject matter of Examples 27-37 includes, instructions that, when executed by the at least one processor, further cause the at least one processor to perform operations to: evaluate a set of input data using a base model of the recurrent neural network; select the adaptation module for evaluating a first subset of the set of input data and another adaptation module for evaluating a second subset of the set of input data based on the evaluation of the set of input data; and determine a set of output values for the set of input data by applying a composition function to a set of base model outputs generated by the base model using the set of parameters, a first set of adaptation outputs generated by the adaptation module using the set of adaptation module parameters, and a second set of adaptation outputs generated by the other adaptation module using another set of adaptation module parameters.

In Example 39, the subject matter of Example 38 includes, wherein the instructions to determine the set of output values further comprises instructions to: set an initial value of each parameter of the set of adaptation module parameters and the other set of adaptation module parameters, wherein the initial value preserves the initial output of the recurrent neural network model; and evaluate output of the composite function using a softmax function to determine the set of output values.

Example 40 is at least one machine-readable medium including instructions that, when executed by processing circuitry, cause the processing circuitry to perform operations to implement of any of Examples 1-39.

Example 41 is an apparatus comprising means to implement of any of Examples 1-39.

Example 42 is a system to implement of any of Examples 1-39.

Example 43 is a method to implement of any of Examples 1-39.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for language model adaptation, the system comprising:

at least one processor; and memory including instructions that, when executed by the at least one processor, cause the at least one processor to perform operations to:

receive a set of adaptation training data and a set of parameters from a recurrent neural network model;

determine a set of adaptation parameters using the set of adaptation training data;

modify a set of outputs of the recurrent neural network model using output of an evaluation of the set of adaptation training data using the set of adaptation parameters;

generate an adaptation module that includes a set of adaptation module parameters based on the modified set of outputs, wherein generating the adaptation module includes backpropagating a set of errors determined by an objective function between the modified set of outputs and a set of true labels to determine the set of adaptation module parameters; and add the adaptation module to the recurrent neural network model for evaluation of inputs corresponding to the set of adaptation module parameters.

2. The system of claim 1, further comprising instructions that, when executed by the at least one processor, further cause the at least one processor to perform operations to:

evaluate a set of input data using a base model of the recurrent neural network;

select the adaptation module based on the evaluation of the set of input data; and determine a set of output values for the set of input data by evaluating a set of base model outputs generated by the base model using the set of parameters and a set of adaptation outputs generated by the adaptation module using the set of adaptation module parameters.

3. The system of claim 2, wherein the instructions to select the adaptation module include instructions to train a gate over a hidden layer output of the base model of the recurrent neural network.

4. The system of claim 2, wherein the instructions to determine the set of output values further comprises instructions to:

set an initial value of each parameter of the set of adaptation parameters, wherein the initial value preserves the initial output of the recurrent neural network model;

apply a composition function to the set of base outputs and the set of adaptation outputs; and evaluate output of the composition function using a softmax function to determine the set of output values.

5. The system of claim 2, wherein the set of base model outputs are received from a first softmax layer of the base model and the set of adaptation outputs is received from a second softmax layer of the adaptation module.

6. The system of claim 2, wherein the base model is a long short-term memory network comprising an embedding layer, a hidden layer, and a projection layer.

7. The system of claim 2, further comprising instructions that, when executed by the at least one processor, further cause the at least one processor to perform operations to:

receive a set of pretraining data; and train a gate using the set of pretraining data and the set of adaptation training data, wherein the trained gate predicts whether input data corresponds to the set of pretraining data or the set of adaptation training data.

8. The system of claim 7, wherein the instructions to select the adaptation module further comprises instructions to evaluate the set of input data using the gate.

9. The system of claim 1, further comprising instructions that, when executed by the at least one processor, further cause the at least one processor to perform operations to:
transmit the recurrent neural network model including the adaptation module to a machine learning processor to evaluate a set of language inputs, wherein a set of language outputs are generated by the recurrent neural network model that includes the adaptation module.

10. The system of claim 1, wherein the instructions to generate the adaptation module further comprises instructions to:
generate a bottleneck layer using a subset of the set of adaptation module parameters; and
add the bottleneck layer to the adaptation module.

11. The system of claim 1, wherein the set of parameters are received from the base model of the recurrent neural network.

12. The system of claim 1, further comprising instructions that, when executed by the at least one processor, further cause the at least one processor to perform operations to:
evaluate a set of input data using a base model of the recurrent neural network;
select the adaptation module for evaluating a first subset of the set of input data and another adaptation module for evaluating a second subset of the set of input data based on the evaluation of the set of input data; and
determine a set of output values for the set of input data by applying a composition function to a set of base model outputs generated by the base model using the set of parameters, a first set of adaptation outputs generated by the adaptation module using the set of adaptation module parameters, and a second set of adaptation outputs generated by the other adaptation module using another set of adaptation module parameters.

13. The system of claim 12, wherein the instructions to determine the set of output values further comprises instructions to:
set an initial value of each parameter of the set of adaptation module parameters and the other set of adaptation module parameters, wherein the initial value preserves the initial output of the recurrent neural network model; and
evaluate output of the composite function using a softmax function to determine the set of output values.

14. A method for language model adaptation, the method comprising:
receiving a set of adaptation training data and a set of parameters from a recurrent neural network model,
determining a set of adaptation parameters using the set of adaptation training data;
modifying a set of outputs of the recurrent neural network model using output of an evaluation of the set of adaptation training data using the set of adaptation parameters;
generating an adaptation module including a set of adaptation module parameters based on the modified set of outputs, wherein generating the adaptation module includes backpropagating a set of errors determined by an objective function between the modified set of outputs and a set of true labels to determine the set of adaptation module parameters; and
adding the adaptation module to the recurrent neural network model for evaluating inputs corresponding to the set of adaptation module parameters.

15. The method of claim 14, further comprising:
evaluating a set of input data using a base model of the recurrent neural network;
selecting the adaptation module based on the evaluation of the set of input data; and
determining a set of output values for the set of input data by evaluating a set of base model outputs generated by the base model using the set of parameters and a set of adaptation outputs generated by the adaptation module using the set of adaptation module parameters.

16. The method of claim 15, further comprising:
receiving a set of pretraining data, and
training a gate using the set of pretraining data and the set of adaptation training data, wherein the training allows the gate to predict whether input data corresponds to the set of pretraining data or the set of adaptation training data.

17. The method of claim 14, wherein generating the adaptation module further comprises:
generating a bottleneck layer using a subset of the set of adaptation module parameters; and
adding the bottleneck layer to the adaptation module.

18. At least one machine-readable non-transitory storage medium including instructions for language model adaptation that, when executed by at least one processor, cause the at least one processor to perform operations to: receive a set of adaptation training data and a set of parameters from a recurrent neural network model; determine a set of adaptation parameters using the set of adaptation training data; modify a set of outputs of the recurrent neural network model using output of an evaluation of the set of adaptation training data using the set of adaptation parameters; generate an adaptation module that includes a set of adaptation module parameters based on the modified set of outputs, wherein generating the adaptation module includes backpropagating a set of errors determined by an objective function between the modified set of outputs and a set of true labels to determine the set of adaptation module parameters; and add the adaptation module to the recurrent neural network model for evaluation of inputs corresponding to the set of adaptation module parameters.

19. The at least one machine-readable storage medium of claim 18, further comprising instructions that, when executed by the at least one processor, further cause the at least one processor to perform operations to:
evaluate a set of input data using a base model of the recurrent neural network;
select the adaptation module based on the evaluation of the set of input data; and
determine a set of output values for the set of input data by evaluating a set of base model outputs generated by the base model using the set of parameters and a set of adaptation outputs generated by the adaptation module using the set of adaptation module parameters.

20. The at least one machine-readable storage medium of claim 19, further comprising instructions that, when executed by the at least one processor, further cause the at least one processor to perform operations to:
receive a set of pretraining data; and
train a gate using the set of pretraining data and the set of adaptation training data, wherein the trained gate predicts whether input data corresponds to the set of pretraining data or the set of adaptation training data.

* * * * *